Jan. 24, 1967  G. C. MARSHALL, JR  3,300,183
WHEEL JACK BRACKET
Filed Oct. 22, 1965  2 Sheets-Sheet 1
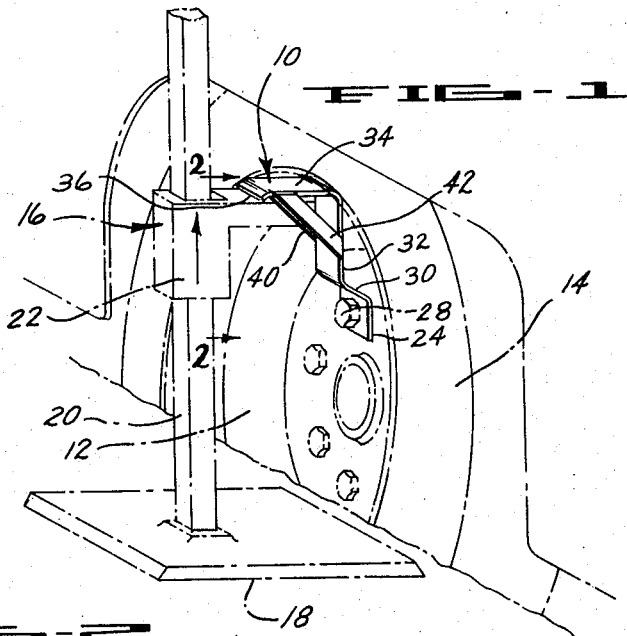
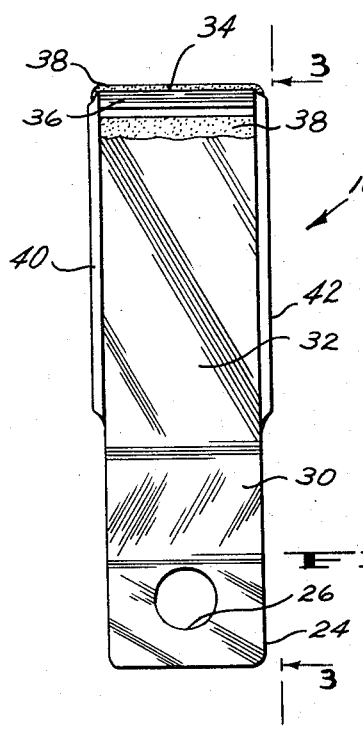
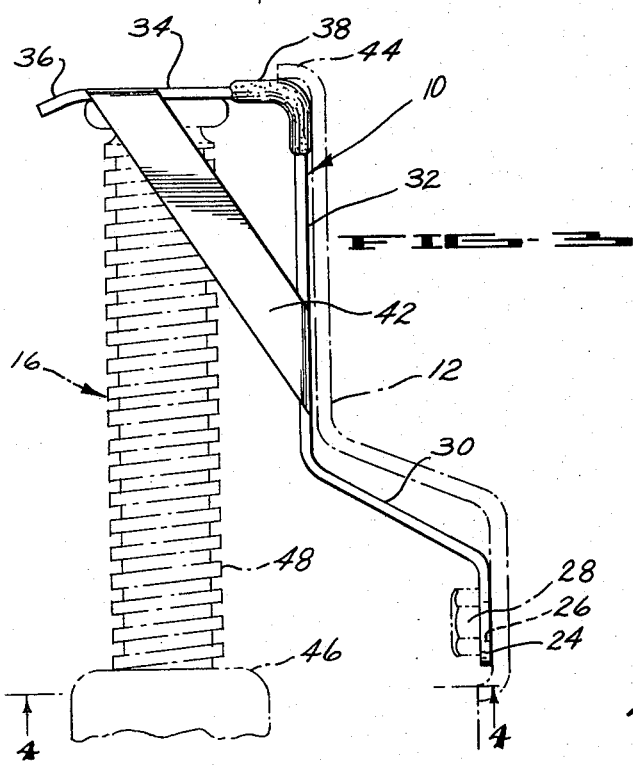
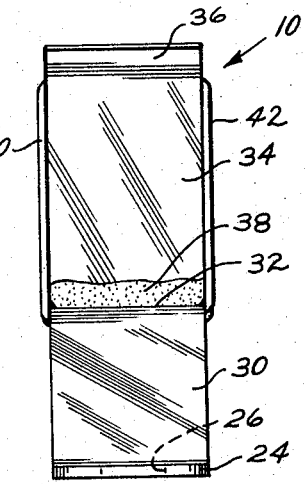
INVENTOR.
GEORGE C. MARSHALL, JR.
BY
ATTORNEY Jan. 24, 1967   G. C. MARSHALL, JR   3,300,183
WHEEL JACK BRACKET
Filed Oct. 22, 1965   2 Sheets-Sheet 2
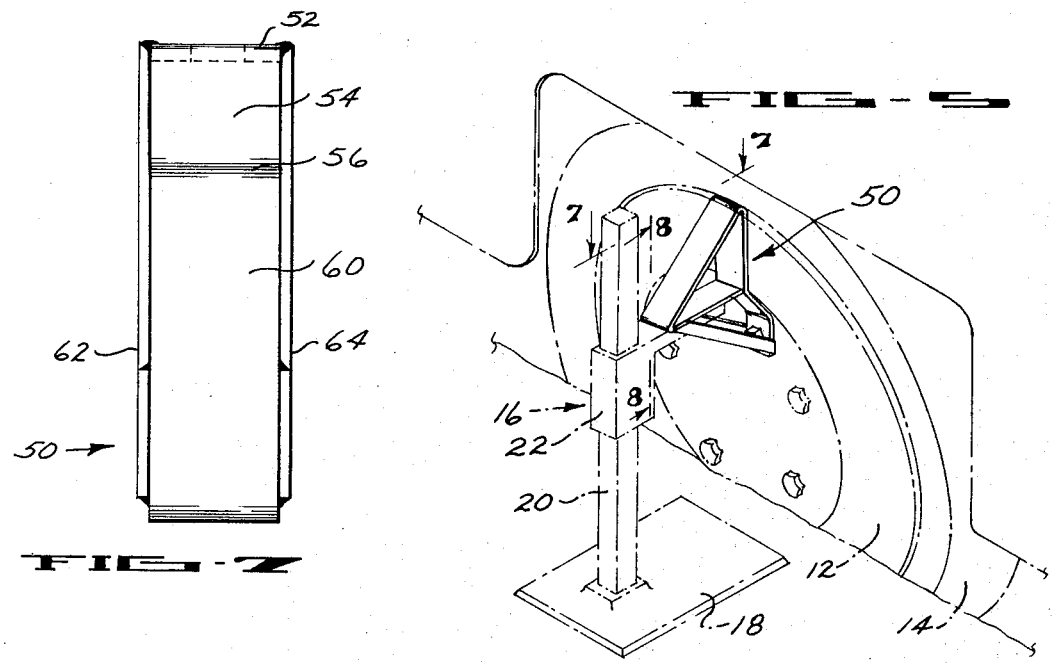
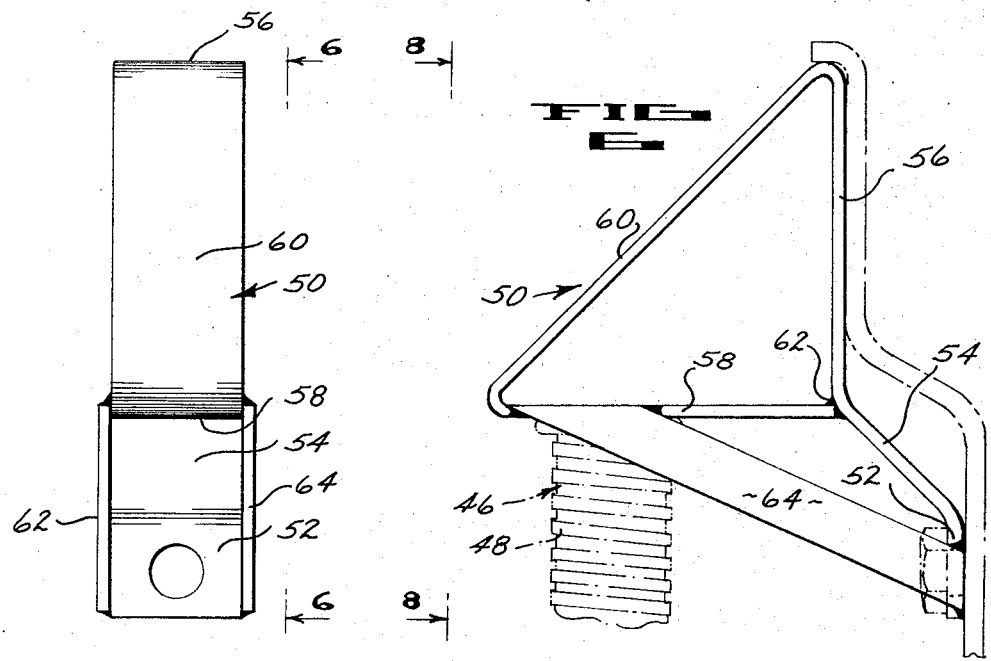
INVENTOR.
GEORGE C. MARSHALL, JR.
BY
ATTORNEY

United States Patent Office 3,300,183
Patented Jan. 24, 1967

3,300,183
WHEEL JACK BRACKET
George C. Marshall, Jr., 2876 Sumner Ave.,
Pomona, Calif. 91767
Filed Oct. 22, 1965, Ser. No. 501,176
13 Claims. (Cl. 254—133)

The present application is a continuation-in-part of application Serial No. 454,789, filed May 11, 1965.

The present invention relates generally to jack brackets or accessories for use with vehicle wheels; more particularly, the invention relates to such a jack bracket or accessory adapted for use in elevating a wheel assembly which is mired or sunken in mud, sand, ice or the like.

The invention provides a bracket or accessory for utilizing a hub stud of a vehicle wheel in applying a jack to elevate the wheel assembly, which eliminates the difficulties involved in positioning a jack below the vehicle axle, frame, bumper or other part. The bracket or accessory of the invention finds particular utility in situations wherein a wheel assembly is mired or sunken in mud, sand, ice or the like. It effectively eliminates or alleviates disadvantages and shortcomings of prior art jack brackets. For example, prior devices involved positioning the jack-engaging portion of the bracket at a relatively low level, whereas the bracket of the present invention provides a jack-engaging arm at a relatively high level to permit positioning of a jack thereunder even in situations wherein the wheel assembly is mired to axle level. The bracket of the invention eliminates any tendency for the wheel being raised to rotate under the application of lifting force, because the bracket is adapted for engagement with the uppermost stud of the wheel, rather than utilizing a lower stud. The jack-engaging arm of the bracket is positioned relatively close to the wheel, thereby providing capability of accommodating heavy load with minimum structure. The device is readily attachable to the uppermost stud of a vehicle road wheel assembly so that a jack may be positioned thereunder to raise the wheel assembly. The device of the invention is particularly adapted for use in situations wherein parts of the vehicle which could normally be brought into engagement with a jack are inaccessible so that it is difficult or impossible to position a jack for operative engagement, as when the vehicle wheel is deeply mired in mud, ice or the like.

It is therefore an object of the present invention to provide a new and improved wheel jack bracket or accessory which is very effective for use with vehicles to accommodate the lifting of the vehicle by means of a jack.

An object of the invention is the provision of a wheel jack bracket for use with a vehicle jack which eliminates the difficulties involved in positioning a jack below a vehicle, particularly in situations wherein the vehicle wheel assembly to be raised is mired in mud or the like, or in situations wherein it is difficult or impossible to position a jack in operative engagement with part of the vehicle.

An object of the invention is to provide a jack bracket having an anchor portion configurated to be secured to the uppermost stud or bolt of the vehicle wheel, and having an arm portion adapted to engage the lifting member of a jack.

It is an object of this invention to provide a wheel jack bracket wherein the jack-engaging portion thereof is positioned at a relatively high level to provide clearance for a jack thereunder in situations wherein the vehicle wheel assembly to be elevated is mired or sunken in mud or the like.

An object of the invention is the provision of a jack bracket according to the foregoing objects which provides a high degree of safety by eliminating any tendency of the wheel to rotate under the lifting force.

An object of the invention is the provision of a jack bracket wherein the jack-engaging portion thereof is positioned relatively close to a wheel being raised, thereby providing improved structural strength with minimum structure.

An object of the invention is to provide a jack bracket wherein brace means are positioned to prevent a jack from slipping out of engagement with the bracket.

It is an object of this invention to provide a jack bracket according to the foregoing objects, which is simplified and practical in construction, strong and reliable in use, inexpensive to fabricate and otherwise well adapted to its intended purposes.

Other objects, features and advantages of the present invention will become apparent to those versed in the art from a consideration of the following description, the appended claims and the accompanying drawings, wherein:

FIGURE 1 is a perspective view of a preferred form of jack bracket according to the invention in operative association with a vehicle wheel assembly and a conventional jack, the wheel assembly and jack being shown in phantom outline.

FIGURE 2 is a front elevational view of the jack bracket of FIGURE 1, taken at line 2—2 of FIGURE 1;

FIGURE 3 is a side elevational view of the jack bracket of FIGURES 1 and 2, taken at line 3—3 of FIGURE 2, and showing a portion of another type of conventional jack in operative association with the bracket;

FIGURE 4 is a bottom view of the jack bracket of FIGURES 1 through 3, taken at line 4—4 of FIGURE 3;

FIGURE 5 is a perspective view of another preferred form of the jack bracket of the invention, showing the bracket in operative association with a vehicle wheel and a jack, the jack and wheel being shown in phantom outline;

FIGURE 6 is a side elevational view of the jack bracket of FIGURE 5, taken at line 6—6 of FIGURE 8, and showing a portion of a type of conventional jack in association with the bracket;

FIGURE 7 is a top view of the jack bracket of FIGURES 5 and 6, taken at line 7—7 of FIGURE 5; and FIGURE 8 is a front elevational view of the jack bracket of FIGURES 5 and 6, taken at line 8—8 of FIGURE 6.

Referring to the drawings, a preferred embodiment of the jack bracket 10 of the invention is shown in FIGURE 1 in operative association with a wheel 12 having a tire 14, and with a conventional jack 16. The jack 16 is of a conventional type comprising a base member or plate 18, an upright 20, and a lifting member 22 mounted on the upright for movement upwardly and downwardly therealong.

Referring to FIGURE 3, the illustrative form of jack bracket 10 of the invention comprises a lower or anchor portion 24 having an opening 26 to accommodate a stud 28, as shown, an intermediate inclined spacer section 30, an upright portion 32 parallel to and spaced outwardly from anchor portion 24, and a horizontal jack-engaging arm portion 34 having a downwardly bent outer end portion 36. A bumper, 38, preferably fabricated of an appropriate plastic or hard rubber, is provided on a shoulder defined between the arm 34 and the upright portion 32 of the bracket, for the purpose of preventing marring of the wheel rim engaged by the shoulder, as indicated in FIGURES 1 and 3. Brace members 40 and 42 extend between the outer portion or horizontal bracket portion 34 and the lower portion of upright bracket portion 32, one brace being secured as by welding on either side of the bracket. FIGURE 3 shows the jack bracket 10 in operative engagement with a jack 46, which is a screw-type jack having a lead screw 48 in engagement with the arm 34 of the bracket.

In utilizing the jack bracket of FIGURES 1 to 4, the user removes the wheel hub cap, then removes the nut from the uppermost wheel stud, positions the jack bracket in the manner shown in FIGURES 1 and 3 with the uppermost stud extending through opening 26 in anchor portion 24 of the bracket, and threads the nut finger-tight upon the stud to bear against the bracket. It will be appreciated that the bracket is equally adapted for use with wheel bolts, as well as studs in wheels which are provided with bolts instead of studs. With the bracket thus positioned, shoulder bumper 38 engaging the rim portion 44 of the wheel, a jack is positioned beneath the arm 34, and is operated to exert force on the bracket arm 38 to raise the wheel assembly and vehicle. Any conventional type of vehicle lifting jack may be utilized, such as the jack 16 of FIGURE 1 and the jack 46 of FIGURE 3.

With the bracket thus mounted on the wheel, jack arm 34 is positioned at a sufficient elevation in relation to the wheel and the ground level that a jack can be accommodated under the arm, even though the wheel is mired or sunken to the level of the vehicle axle or above. The jack arm is thus elevated because of the bracket structure and the manner in which it engages the uppermost wheel stud and the upper portion of the wheel rim.

The wheel assembly is raised to a level or position wherein the wheel assembly is sufficiently elevated relative to the rut to permit the filling of the rut with rocks or other appropriate material, whereupon the vehicle is driven away from the rut. The jack is, of course, contracted and removed prior to moving the vehicle.

FIGURES 5 through 8 illustrate another preferred embodiment of the jack bracket of the invention. Jack bracket 50 comprises an anchor portion 52, an inclined spacer section 54, an upright portion 56 which is parallel to and spaced outwardly from anchor portion 52 in order to adapt the bracket to accommodate the configuration of the wheel 12. A jack arm 58 extends perpendicularly outward from the upright portion 56. A strut section 60 extends between the outer end of the jack arm and the upper or outer end of upright portion 56. These bracket portions and sections are preferably formed integrally of a single piece of appropriate material, such as alloy steel, as by mending, and are secured by welding, as indicated at 62 (FIGURE 6). As shown, there is defined by strut section 60 and upright portion 56 a shoulder which is adapted to engage the outer rim of the wheel 12. A brace member 64 is secured as by welding on each side of jack arm 56 between the outer portion of the jack arm and anchor portion 50, in order to provide structural strength and to transmit jack-applied load to the anchor portion.

FIGURE 5 shows the jack bracket 50 in operative engagement with a jack 16 like that shown with jack bracket 10 in FIGURE 1. FIGURE 6 shows bracket 50 in operative association with a jack 46 of the type shown with jack bracket 10 in FIGURE 3.

With the jack bracket 50 mounted for service, as shown in FIGURES 5 and 6, its jack arm 58 is positioned somewhat more than the corresponding position of jack arm 34 of jack bracket 10 of FIGURES 1 through 4. However, jack arm 58 is positioned well above the axis of the wheel and provides sufficient space thereunder to accommodate a jack in most circumstances.

Jack brackets according to the invention are typically utilized in situations wherein a vehicle wheel is mired or sunken deeply in a rut, mud, sand, ice or the like, so that the vehicle parts normally utilized in cooperation with a jack, such as the axle, frame or bumper, are inaccessible in that they are too close to the ground level to accommodate the placement of a jack thereunder for the purpose of elevating the wheel.

In appropriate situations, the vehicle wheel assembly is elevated to a position wherein snow chains may be mounted thereon to facilitate movement of the vehicle from its mired position. In situations wherein the wheel is to be changed, after the wheel is elevated an appropriate block or other object may be positioned below an appropriate vehicle part, such as an axle or frame to support the vhicle, whereupon the jack may be contracted and removed.

Brackets according to the invention provide a high degree of strength and reliability, because of their adaptation for engagement with a jack relatively close to a wheel, thereby minimizing the cantilever arm against which the jack operates. The brace members assist in providing structural strength.

The braces being disposed on either side of a jack part in engagement with the jack arm of the bracket, serve to pervent the jack from slipping or moving out of engagement with the bracket under load, thereby providing enhanced safety.

Jack brackets according to the invention permit assembly of a bracket to a wheel and the operation of a jack in cooperation with the bracket with all operations being performed adjacent to the outer side of the wheel. The advantage is thereby provided of eliminating any necessity for reaching or digging under a vehicle to position a jack under an axle, frame part or other vehicle component.

Brackets according to the invention providing a distinct advantage by eliminating any tendency of a wheel to rotate under the lifting and supporting force applied by a jack, because the bracket is adapted for securement to the uppermost stud of the wheel, whereas many prior devices are attached to a lower stud.

Those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. A bracket for engagement by a jack to raise a vehicle road wheel assembly having spaced circularly arranged studs, comprising
   an anchor portion having a stud-receiving opening positioned for securement to the uppermost stud of said circularly arranged wheel studs,
   an upright portion connected with the anchor portion and extending radially of the wheel to the rim thereof,
   a shoulder at the upper end of said upright bracket portion and adapted to engage the outer rim portion of the wheel to transmit load thereto,
   and a jack arm extending perpendicularly outward relative to the upright portion and adapted to engage a jack.

2. A jack bracket according to claim 1, and further including brace means secured to the outer portion of the jack arm and to a portion of the bracket adjacent to the wheel to provide structural strength to accommodate the lifting force of a jack.

3. A jack bracket according to claim 1, and further including brace means secured to the outer portion of the jack arm and to a portion of the bracket adjacent to the wheel to provide structural strength to accommodate the lifting force of a jack, said brace means comprising a brace member disposed on either side of a jack in engagement with said arm to prevent the jack from slipping out of engagement with said arm.

4. A jack bracket according to claim 1, and further including an inclined intermediate spacer section between the anchor portion and the upright portion to space the upright portion outwardly from the anchor portion to adapt the bracket to the configuration of the wheel assembly.

5. A bracket for engagement by a jack to raise a vehicle road wheel assembly having spaced circularly arranged studs, comprising
   an anchor portion having a stud-receiving opening positioned for securement to the uppermost stud of said circularly arranged wheel studs,
   an upright portion connected with the anchor portion and extending radially of the wheel to the rim thereof, and
   a jack arm extending outwardly from the upper end of said upright portion,
   said arm and said upright portion defining a shoulder adapted to engage the outer rim portion of the wheel to transmit load thereto.

6. A jack bracket according to claim 5, and further including an inclined spacer section between the anchor portion and the upright portion to space the upright portion outwardly from the anchor portion to adapt the bracket to the configuration of the wheel assembly.

7. A bracket for engagement by a jack to raise a vehicle road wheel assembly having spaced circularly arranged studs, comprising
   an anchor portion having a stud-receiving opening positioned for securement to the uppermost stud of said circularly arranged wheel studs,
   an upright portion connected with the anchor portion and extending radially of the wheel to the rim thereof,
   a jack arm extending outwardly from the upper end of said upright portion,
   said arm and said upright portion defining a shoulder adapted to engage the outer rim portion of the wheel to transmit load thereto,
   and brace means extending between the upright portion and the jack arm to provide reinforcement to accommodate the lifting force of a jack.

8. A jack bracket according to claim 7, wherein said brace means comprise brace members on either side of the jack arm to prevent a jack from slipping out of engagement with said arm.

9. A bracket for engagement by a jack to raise a vehicle road wheel assembly having spaced circularly arranged studs, comprising
   an anchor portion having a stud-receiving opening positioned for securement to the uppermost stud of said circularly arranged wheel studs,
   an upright portion connected with the anchor portion and extending radially of the wheel to the rim thereof,
   a jack arm extending outwardly relative to the upright portion and adapted to engage a jack, and
   a strut section extending between the jack arm and the upright portion.

10. A jack bracket according to claim 9, wherein the strut section and the upright portion cooperate to define a shoulder adapted to engage the outer rim portion of the wheel.

11. A bracket for engagement by a jack to raise a vehicle road wheel assembly having spaced circularly arranged studs, comprising
    an anchor portion having a stud-receiving opening positioned for securement to the uppermost stud of said circularly arranged wheel studs,
    an upright portion connected with the anchor portion and extending radially of the wheel to the rim thereof,
    a jack arm extending outwardly relative to the upright portion and adapted to engage a jack,
    a strut section extending between the jack arm and the upright portion,
    and brace means extending between the anchor portion and the outer end of the jack arm.

12. A jack bracket according to claim 11, wherein said brace means comprise brace members on both sides of the jack arm to prevent a jack from slipping out of engagement with said arm.

13. A jack bracket according to claim 9, and further including an inclined intermediate spacer section between the anchor portion and the upright portion to space the upright portion outwardly from the anchor portion to adapt the bracket to the configuration of the wheel assembly.

References Cited by the Examiner

UNITED STATES PATENTS 2,616,665  11/1952  Alton _____ 254—133

FOREIGN PATENTS 1,187,243  3/1959  France.

WILLIAM FELDMAN, *Primary Examiner.*

OTHELL M. SIMPSON, *Examiner.*